Nov. 9, 1948.  H. P. KLEINKORT  2,453,139
TOW RELEASE MECHANISM
Filed June 14, 1946  2 Sheets-Sheet 1
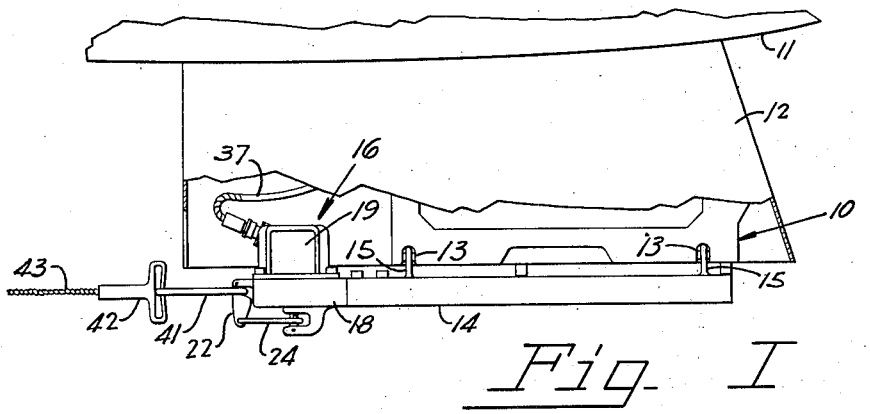
Fig. I
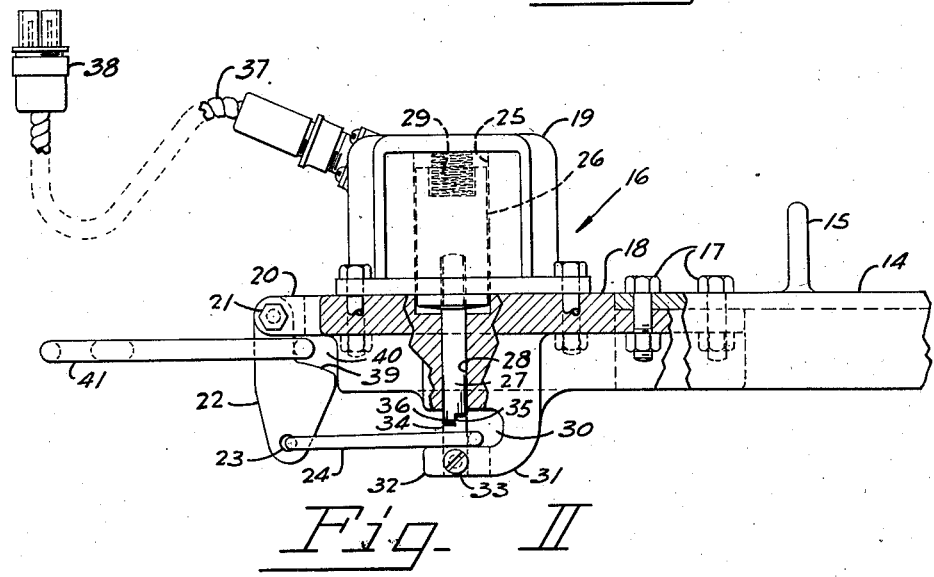
Fig. II
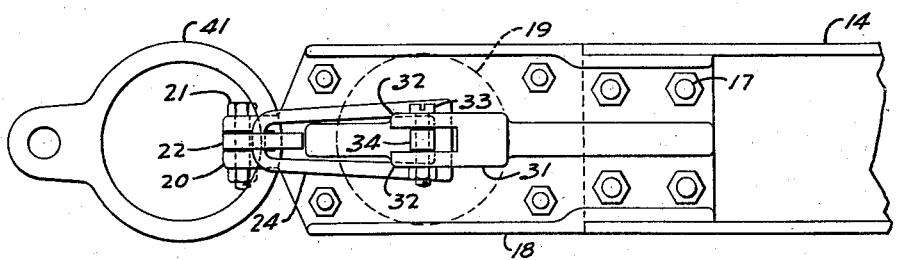
Fig. III
INVENTOR.
Henry Peter Kleinkort
BY
Marshall and Marshall
ATTORNEYS Nov. 9, 1948.     H. P. KLEINKORT     2,453,139
TOW RELEASE MECHANISM
Filed June 14, 1946                2 Sheets-Sheet 2
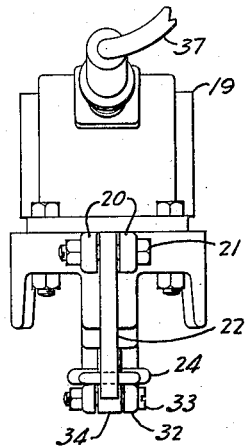
Fig. V
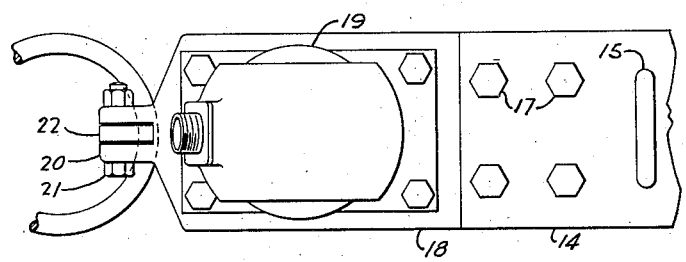
Fig. IV
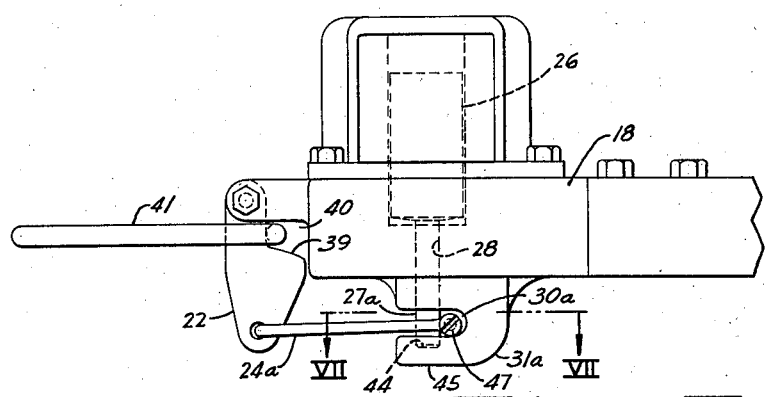
Fig. VI
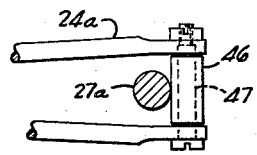
Fig. VII
INVENTOR.
Henry Peter Kleinkort
BY Marshall and Marshall
ATTORNEYS Patented Nov. 9, 1948

2,453,139

UNITED STATES PATENT OFFICE 2,453,139

TOW RELEASE MECHANISM

Henry P. Kleinkort, New Washington, Ohio, assignor to Agatha K. Bremer, New Washington, Ohio Application June 14, 1946, Serial No. 676,836

4 Claims. (Cl. 280—33.15)

This invention relates to tow release mechanism of the type employed in aircraft for connecting the tow cables of devices such as target sleeves, gliders, glider bombs, etc. to towing aircraft and more particularly to mechanism for effecting a positive release of such devices when desired.

When an aircraft and, in particular, a high-speed airplane is towing a gliding device, the air resistance created by the towed device is substantial and it sometimes becomes necessary to release such device instantly and positively so that the towing aircraft may defend itself from attack. Similarly, if it is necessary to release the towed device at an exact point to permit its further operation, for example, the landing of a passenger carrying glider or the direction at the target of a glider bomb, it is necessary that the tow release be positive in action.

In order to obtain positive release the towing cable often is released at its point of connection to the towed mechanism, in the case of a passenger carrying glider, for example, by the pilot of the glider. However, this still leaves the towing cable itself attached to the towing aircraft and unless this cable can be released from the towing aircraft it is extremely likely to become fouled on landing and cause accidents.

It is the principal object of this invention to provide a tow release mechanism which can be actuated by the standard controls already existent in an operational aircraft and which is positive in action.

It is another object of this invention to provide a tow release mechanism which can very quickly be attached to or detached from an operational aircraft without the addition thereto of special brackets or attachments.

It is a further object of this invention to provide a tow release mechanism which can be jettisoned completely in the event of power or other failure rendering its normal release mechanism inoperative.

More specific objects and advantages are apparent from the description, in which reference is had to the accompanying drawings illustrating a preferred form of mechanism embodying the invention.

In the drawings:

Figure I is a side elevation of a tow release mechanism embodying the invention showing its attachment to a bomb rack as employed in an operational aircraft.

Figure II is a fragmentary elevation on a greatly enlarged scale of a tow release mechanism embodying the invention, certain parts being broken away to more clearly show their operation.

Figure III is a fragmentary view from below of that portion of the device shown in Figure II.

Figure IV is a fragmentary plan view of that portion of the device shown in Figure II.

Figure V is a rear elevation of a tow release mechanism embodying the invention.

Figure VI is a fragmentary side elevation showing a portion of a tow release mechanism similar to that illustrated in Figure II, but of a modification of a portion of the mechanism.

Figure VII is a fragmentary horizontal section taken substantially on the line VII—VII of Figure VI.

A bomb rack 10 is mounted on the under belly of an aircraft 11 and may be enclosed by a faired housing 12. The bomb rack 10 may be equipped with two release fingers 13 which normally are actuated for the release of bombs or other devices carried therein by operation of a control button which usually is located in the handle of the control stick of the aircraft. Bomb racks as employed in operational aircraft also usually have an auxiliary mechanical release which may be employed to operate the release fingers 13 in the event of failure of the electrical mechanism.

A tow release bracket 14 is designed to fit the particular bomb rack with which the aircraft to be employed is equipped. In the example illustrated the bracket 14 has two loops 15 wedged or otherwise secured on its upper surface which fit into spaces in the bomb rack and are held therein by engagement with the release fingers 13.

A releasing mechanism 16 is secured to the after end of the bracket 14 by bolts 17. The mechanism 16 has a main frame 18 on the upper surface of which is mounted a solenoid 19. The main frame 18 has a rearwardly extending bifurcated portion 20 through the arms of which a horizontally disposed bolt 21 is threaded. The bolt 21 serves as a mount for a downwardly extending lever 22. Through the lower portion of the lever 22 there is bored a hole 23 in which is located one end of a stirrup link 24.

The solenoid 19 comprises a coil in the center of which there is located a vertically extending bore 25 and a solenoid core 26 which is located in the bore 25. A short rod 27 is fixed in the core 26 and extends downwardly through a bore 28 drilled in the frame 18. A coil spring 29 is located in the upper end of the bore 25 and serves to press the core 26 and rod 27 downwardly when the solenoid is not energized. The lower end of the rod 27 extends into a space 30 behind a hook-shaped bracket 31 formed on the underside of the frame 18. The bracket 31 has two spaced arms 32 through which there extends a bolt 33. An upwardly extending finger 34 is mounted on the bolt 33 so that it will pivot in a vertical plane with the bolt 33 as its axis. The lower end of the rod 27 has a shoulder 35 which cooperates with a similar but oppositely cut shoulder 36 cut in the upper end of the finger 34. An end of the stirrup link 24 opposite that end pivoted in the lever 22, extends into the space 30 and is held therein behind the finger 34 by engagement of the shoulders 35 and 36.

An armored electrical conducting cable 37 connects the solenoid 19 to a power source and the standard bomb release button which usually is located in the handle of the control stick of the aircraft. The cable 37 is equipped with a connecting plug 38 which is designed to fit the standard bomb release connector.

The lever 22 has a shoulder 39 extending forwardly close to the lower rear of the frame 18 and forming a space 40 in which a tow cable connecting ring 41 is placed. The ring 41 is mounted in a tow cable fixture 42 to which a tow cable 43 is secured.

In Figure VI a modification of the releasing device is shown. In this modification a rod 27a is fixed in the lower end of the solenoid core 26 and extends downwardly through the bore 28 in the frame 18. The lower end of the rod 27a extends into a socket 44 which is bored in a lower arm 45 of a hook-shaped bracket 31a located on the underside of the frame 18. One end of a stirrup link 24a is secured in the lower portion of the lever 22 and has a roller 46 horizontally journaled on a bolt 47 extending between its arms. The roller 46 substantially fills a space 30a defined by the bracket 31a.

In operation the tow release mechanism is attached to the bomb rack in the following way: The bomb release button is pressed causing the fingers 13 to withdraw and permitting the loops 15 to be inserted in place. The button is then released. The cable connecting the bomb release mechanism to the control button is detached and the plug is attached in its place. The button is again depressed causing the solenoid 19 to pull the rod 27 upwardly. The finger 34 is swung back permitting the stirrup 24 and lever 22 to be swung backwardly and upwardly. The link 24 is threaded through the ring 41 and the ring 41 positioned above the shoulder 39. The forward end of the link 24 is placed in the space 30, the finger 34 swung upwardly and the bomb release button is then released permitting the rod 27 to be positioned to hold the finger 34 in place.

When the aircraft is in flight and it is desired to release the towed device the bomb release button is pressed energizing the solenoid 19 which in turn withdraws the rod 27. A drag created on towed devices by air resistance exerts tremendous force on the cable 43 pulling on the ring 41 causing the lever 22 to swing back and up withdrawing the link 24 from the space 30 as the finger 34 swings back and down between the arms 32 of the bracket 31.

The lever 22 is of the "second class" in order to substantially reduce the pressure exerted by the stirrup link 24 against the finger 34 when held in place thereby.

In the embodiment shown in Figure VI the roller 46 is held against the rod 27a by the drag but when the solenoid is energized and the rod withdrawn upwardly the roller decreases the friction of such withdrawal allowing the device to work freely.

It is contemplated that under adverse conditions, for example power failure, it may not be possible to operate the tow release mechanism electrically. In such case the operator of the towing aircraft can jettison the entire mechanism by manually operating an auxiliary mechanism to cause the fingers 13 in the bomb rack to withdraw thus releasing the loops 15 and the bracket 14. For this reason the cable 37 is attached to the solenoid 19 by a friction connection which parts easily when the tow release mechanism is no longer held in the bomb rack. Such auxiliary mechanism is standard equipment in operational aircraft.

The embodiment of the invention that has been disclosed may be modified to meet various requirements.

Having described by inventions, I claim:

1. In a tow cable releasing mechanism, in combination, a frame, a force reducing lever pivoted at one end on said frame, a link pivotally attached to the other end of said lever, a device mounted on said frame for holding that end of said link not attached to said lever and means for causing said device to release said link, said frame, said lever and said link defining a space in which a tow cable fitting can be held, such space being located longitudinally along said lever whereby such fitting engages said lever between the points of connection of said lever and said frame and of said lever and said link.

2. In a tow cable releasing mechanism, in combination, a frame, a force reducing lever pivoted at one end on said frame and extending transversely to the line of pull of the tow, a link pivotally attached to the other end of said lever and extending parallel to the line of pull, a freely movable member mounted on said frame for holding that end of said link not attached to said lever and releasable means for holding said member immovable, said frame, said lever and said link defining a space in which a tow cable fitting can be held, such space being located longitudinally along said lever whereby such fitting engages said lever between the points of connection of said lever and said frame and of said lever and said link.

3. In a tow cable releasing mechanism, in combination, a frame, a lever pivoted at one end on said frame, a link pivotally attached to the other end of said lever, a freely movable toggle engageable with the free end of said link and releasable means for holding said toggle in engagement with the free end of said link, said frame, said lever and said link defining a space in which a tow cable fitting can be held.

4. A tow cable releasing mechanism comprising, in combination, a frame, a lever pivoted at its upper end on said frame and extending downwardly transversely to the line of force of the tow, a link pivotally connected to the lower end of said lever, a freely movable member mounted in a section of said frame and adapted to engage and hold the free end of said link with said link in horizontal position, parallel to the line of force of said tow and releasable means for immovably holding said member in engaged position with said link, a tow cable ring-fitting being engageable over said lever between its ends.

HENRY P. KLEINKORT.

REFERENCES CITED

The following references are of record in the file of this patent:

UNITED STATES PATENTS

| Number | Name | Date |
| --- | --- | --- |
| 331,284 | Davis | Dec. 1, 1885 |
| 870,177 | Hurd | Nov. 7, 1907 |
| 916,830 | Bergman | Mar. 30, 1909 |
| 1,430,922 | Mueller | Oct. 3, 1922 |
| 2,396,921 | Leslie | Mar. 19, 1946 |

FOREIGN PATENTS

| Number | Country | Date |
| --- | --- | --- |
| 102,047 | Austria | Dec. 10, 1925 |